United States Patent
Sawada et al.

(10) Patent No.: US 8,789,879 B2
(45) Date of Patent: Jul. 29, 2014

(54) DEFLECTOR APPARATUS FOR VEHICLE

(71) Applicant: Aisin Seiki Kabushiki Kaisha, Kariya (JP)

(72) Inventors: Kazuki Sawada, Handa (JP); Yasunobu Niimi, Anjo (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/832,567

(22) Filed: Mar. 15, 2013

(65) Prior Publication Data

US 2013/0249255 A1    Sep. 26, 2013

(30) Foreign Application Priority Data

Mar. 21, 2012   (JP) ................................. 2012-063949

(51) Int. Cl.
*B60J 7/22*   (2006.01)

(52) U.S. Cl.
CPC ........................................ *B60J 7/22* (2013.01)
USPC ........................................................ 296/217

(58) Field of Classification Search
CPC ........................................................ B60J 7/22
USPC ........................................................ 296/217
See application file for complete search history.

(56) References Cited

U.S. PATENT DOCUMENTS

| | | | | |
|---|---|---|---|---|
| 4,867,503 A | * | 9/1989 | Luksch et al. | 296/217 |
| 6,834,914 B2 | * | 12/2004 | Bohm et al. | 296/217 |
| 7,837,258 B2 | | 11/2010 | Bergmiller | |
| 8,267,465 B2 | * | 9/2012 | Wetzels et al. | 296/180.1 |
| 2008/0246306 A1 | | 10/2008 | Oerke et al. | |

FOREIGN PATENT DOCUMENTS

| | | |
|---|---|---|
| DE | 10 2005 063 099 A1 | 7/2007 |
| DE | 10 2008 057 799 A1 | 5/2010 |
| EP | 1 977 923 A2 | 10/2008 |
| JP | 2009-515748 | 4/2009 |

\* cited by examiner

*Primary Examiner* — Dennis H Pedder
(74) *Attorney, Agent, or Firm* — Finnegan, Henderson, Farabow, Garrett & Dunner, LLP

(57) ABSTRACT

Provided is a deflector apparatus for a vehicle including a deflector that is installed at a front edge portion of an opening portion formed in a roof portion and that is capable of being unfolded so as to protrude onto the face of the roof portion, the deflector including an upper frame and a lower frame that extend along the front edge portion, a mesh member that has both terminal portions in a lateral direction buried in the upper frame and the lower frame, respectively, and extends along the front edge portion, and a reinforcing member that is buried in at least one of the upper frame and the lower frame and extends along the front edge portion, in which the reinforcing member is formed with a hollow portion that communicates in the extending direction of the reinforcing member and opens from the upper frame or the lower frame.

12 Claims, 8 Drawing Sheets

12: DEFLECTOR
21: MESH MEMBER
21a, 21b: TERMINAL PORTION
22: LOWER FRAME
23: UPPER FRAME
31: REINFORCING MEMBER

DEFLECTOR APPARATUS FOR VEHICLE

CROSS REFERENCE TO RELATED APPLICATIONS

This application is based on and claims priority under 35 U.S.C. §119 to Japanese Patent Application 2012-063949, filed on Mar. 21, 2012, the entire content of which is incorporated herein by reference.

TECHNICAL FIELD

This disclosure relates to a deflector apparatus for a vehicle installed at a front edge portion of an opening portion formed in a roof portion of the vehicle.

BACKGROUND DISCUSSION

In the related art, various deflector apparatuses have been suggested as a deflector apparatus for a vehicle. For example, a deflector apparatus for a vehicle disclosed in JP 2009-515748T (Reference 1), as shown in FIG. 7, includes a fixed frame 91 that extends along a front edge portion of an opening portion and is fixed to a mounting frame of the opening portion, and a movable frame 93 that is turnably coupled to the fixed frame 91 via a pivoting device 92 and is movable between a stored position and an unfolded position with respect to the fixed frame 91. A mesh member 94 having flexibility and air permeability is interposed between both the frames 91 and 93. The mesh member 94 is pulled with the movement of the movable frame 93 to the unfolded position, and thereby protrudes onto the face of a roof portion together with the movable frame 93, and the mesh member passes air therethrough within a range of at least a portion of the surface thereof.

Additionally, for example, a deflector apparatus for a vehicle disclosed in EP 1977923A (Reference 2), as shown in FIGS. 8A and 8B, suggests that a cylindrical reinforcing material 96 or a substantially H-shaped reinforcing material 97 is covered with a pad 98 made of a soft material (for example, rubber, polyurethane foam, or a porous and permeable material), and an outer shape is molded by the pad 98.

Incidentally, in the deflector apparatus for a vehicle of Reference 1, for example, methods, such as clamping, welding, sewing, adhesive bonding, and insertion, are adopted in combining terminal portions of the mesh member 94 and the frames (connecting elements) 91 and 93. Thus, the number of manufacturing steps has a tendency to increase since a combining process of the mesh member 94 and the frames 91 and 93 that are individually manufactured is required. Additionally, during the combining work of the mesh member 94 and frames 91 and 93, a relative positional gap is easily produced between these. Thus, creases may be created in the mesh member 94. In this case, the external appearance when the mesh member 94 protrudes onto the face of the roof portion together with the movable frame 93 may deteriorate.

On the other hand, in the deflector apparatus for a vehicle of Reference 2, the soft material tends to expand and contract. Thus, the adhesion between the reinforcing materials 96 and 97 may become inadequate.

SUMMARY

In order to solve the above problems, according to a first aspect of this disclosure, there is provided a deflector apparatus for a vehicle including a deflector that is installed at a front edge portion of an opening portion formed in a roof portion of the vehicle and that is capable of being unfolded so as to protrude onto the face of the roof portion, the deflector including: an upper frame and a lower frame that extend along the front edge portion of the opening portion and are made of resin; a mesh member that has both terminal portions in a lateral direction buried in the upper frame and the lower frame, respectively, and extends along the front edge portion of the opening portion; and a reinforcing member that is buried in at least one of the upper frame and the lower frame and extends along the front edge portion of the opening portion, in which the reinforcing member is formed with a hollow portion that communicates in the extending direction of the reinforcing member and opens from the upper frame or the lower frame at both ends thereof.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment disclosed here will be explained with reference to FIGS. 1 to 6. In addition, in the following, the front-and-rear direction of a vehicle is referred to as a "front-and-rear direction", and the upper side and lower side of the vehicle in the height direction are referred to as "upper side" and "lower side", respectively. Additionally, the inside in the vehicle width direction that is directed to the inside of a vehicle interior is referred to "vehicle inside", and the outside in the vehicle width direction that is directed to the outside of the vehicle interior is referred to as "vehicle outside".

Figure 1:
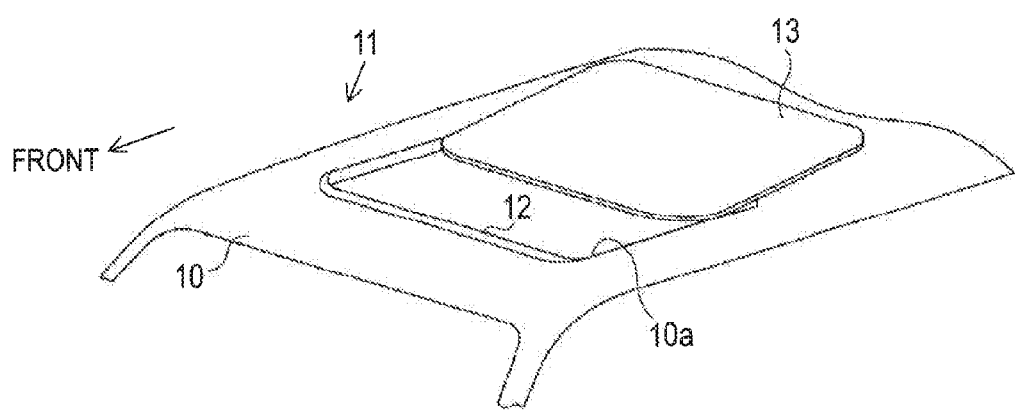
FIG. 1 is a perspective view of a roof viewed obliquely from above.

As shown in FIG. 1, a roof 10 as a roof portion of a vehicle, such as an automobile is formed with a substantially quadrangular roof opening portion 10a as an opening portion, and is mounted with a sunroof apparatus 11. The sunroof apparatus 11 includes a deflector 12 that is arranged and supported at a front edge portion of the roof opening portion 10a that extends in the vehicle width direction, and includes a substantially quadrangular movable panel 13 that moves in the front-and-rear direction to open and close the roof opening portion 10a, and is made of, for example, a glass plate.

The deflector 12 is attached so as to be capable of performing a so-called tilt-up operation so that a front part moves upward as the deflector turns about a rear part thereof. The deflector 12 is released from the movable panel 13 side with the opening operation of the movable panel 13 to perform the tilt-up operation, and protrudes above the top face of the roof 10 (unfolded state). Otherwise, the deflector 12 is pushed down from the movable panel 13 side with the closing operation of the movable panel 13, and fits under the top face of the roof 10 (stored state). When the deflector 12 has opened the roof opening portion 10a, the deflector is brought into an unfolded state to prevent the air vibration by the inclusion of wind into the vehicle interior.

The movable panel 13 is attached so as to be capable of performing a tilt-up operation in which a rear part moves upward as the movable panel turns about a front part thereof, and a sliding operation in the front-and-rear direction. In the opening and closing operation of the movable panel 13, a so-called outer sliding type in which the sliding operation is performed in a tilt-up state is adopted.

Figure 2:
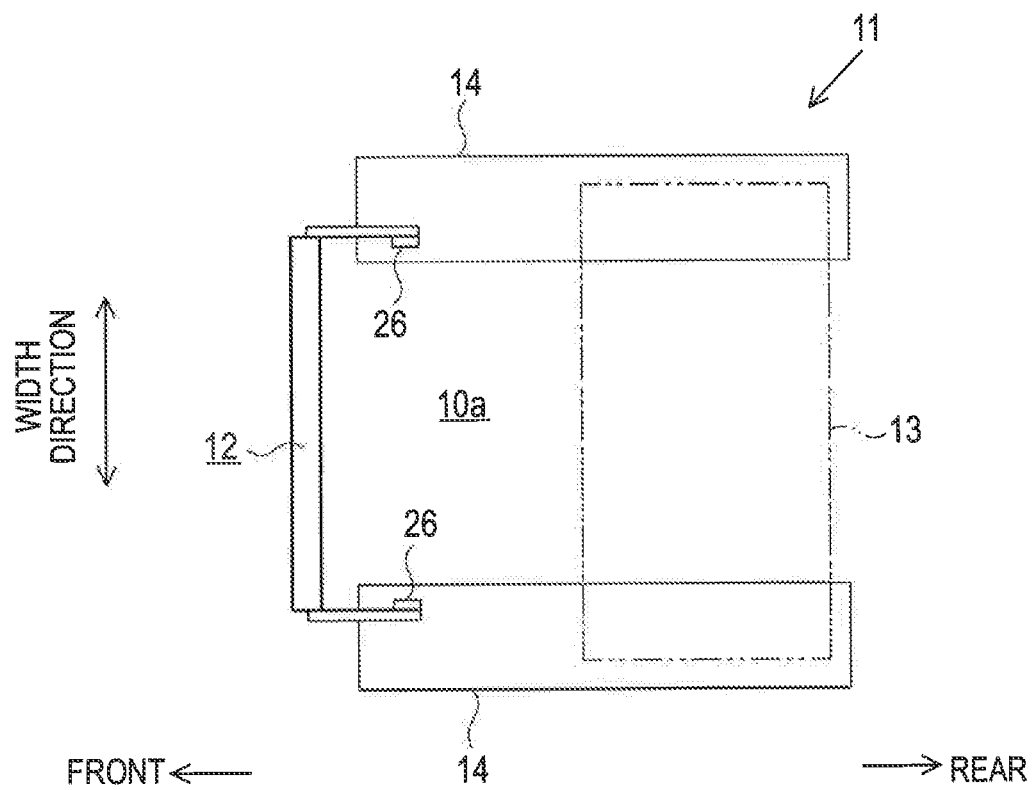
FIG. 2 is a plan view schematically showing one embodiment of this disclosure.

As shown in FIG. 2, the sunroof apparatus 11 includes a pair of guide rails 14 that are arranged and fixed at both side edges of the roof opening portion 10a in the vehicle width direction. Each guide rail 14 is made of, for example, an extruded material of an aluminum alloy, has a uniform section in a longitudinal direction, and extends in the front-and-rear direction. In addition, a proper driving mechanism (not shown) for driving to open and close the movable panel 13 slides on the guide rail 14. Additionally, both ends of the deflector 12 in the vehicle width direction are turnably coupled to front end portions of both the guide rails 14, respectively.

Next, the deflector 12 and its supporting structure will be explained.

Figure 3:
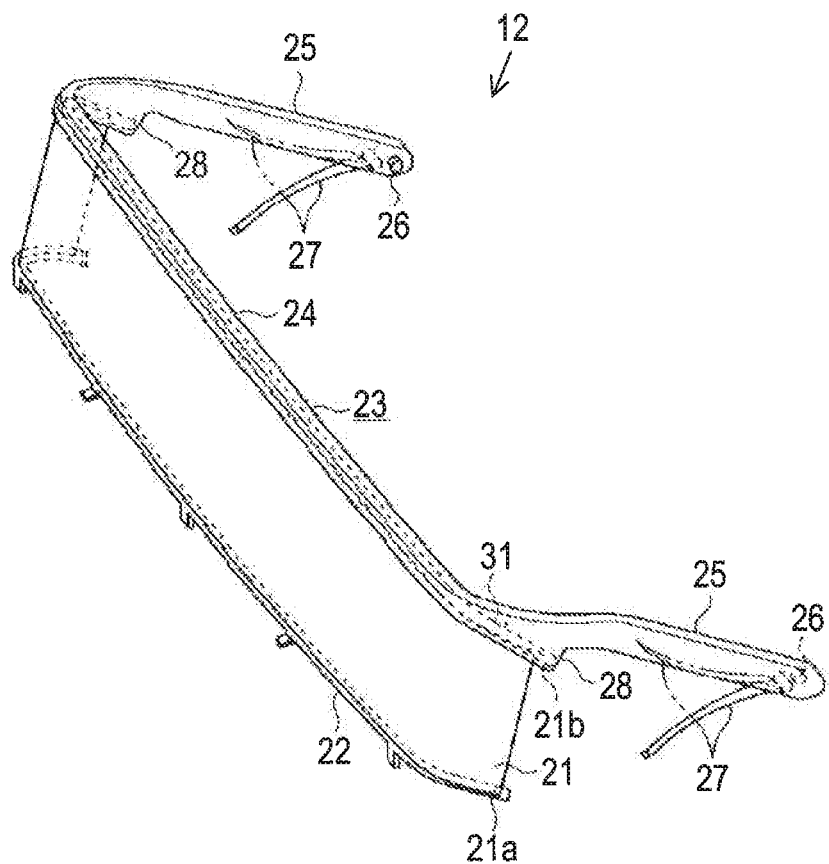
FIG. 3 is a perspective view showing the embodiment.

As shown in FIG. 3, the deflector 12 includes a substantially beltlike mesh member 21 that extends along the front edge portion of the roof opening portion 10a and is made of, for example, a resin material, and substantially rod-shaped lower frame 22 and upper frame 23 that are made of a resin material (for example, a resin material containing glass fibers) that buries both terminal portions 21a and 21b, respectively, in the lateral direction of the mesh member over the total longitudinal length of the mesh member 21. The lower frame 22 is molded so as to be slightly longer than the longitudinal length (of the terminal portion 21a) of the mesh member 21 in the extending direction of the lower frame, and is resin-molded integrally with the terminal portion 21a so as to bury the terminal portion over its total length. The upper frame 23 has a frame portion 24 that is molded so as to be slightly longer than the longitudinal length of the mesh member 21 (terminal portion 21b) in an extending direction (vehicle width direction) along the front edge portion of the roof opening portion 10a, and has a pair of arm portions 25 at rear end portions that extend from both ends of the frame portion 24 in its extending direction to the rear of the vehicle. The frame portion 24 (upper frame 23) is resin-molded integrally with the terminal portion 21b so as to bury the terminal portion over its total length.

The lower frame 22 is fixed to and supported by the front edge portion of the roof opening portion 10a. On the other hand, the upper frame 23 has integrally substantial columnar rotating shafts 26 that face each other from rear end portions of both the arm portions 25 and protrude toward the vehicle inside, and is turnably coupled to front end portions of both the guide rails 14 in the rotating shafts 26. Accordingly, if the upper frame 23 turns clockwise in the drawing about both the rotating shafts 26, the upper frame 23 moves up with respect to the lower frame 22. With this movement, the deflector 12 stretches the mesh member 21, having the terminal portions 21a and 21b fixed to the lower frame 22 and the upper frame 23, in the lateral direction of the mesh member, to unfold the mesh member so as to protrude onto the face of the roof 10. Accordingly, if the upper frame 23 turns counterclockwise in the drawing about both the rotating shafts 26, the upper frame 23 moves down with respect to the lower frame 22. With this movement, the deflector 12 shortens the mesh member 21, having the terminal portions 21a and 21b fixed to the lower frame 22 and the upper frame 23, in the lateral direction of the mesh member, and is stored so as to fit under the top face of the roof 10. In addition, springs 27 that bias the upper frame 23 toward the side to which the upper frame turns clockwise in the drawing about both the rotating shafts 26 and are made of, for example, flat springs are disposed at rear end portions of both the arm portions 25.

Figure 4A:
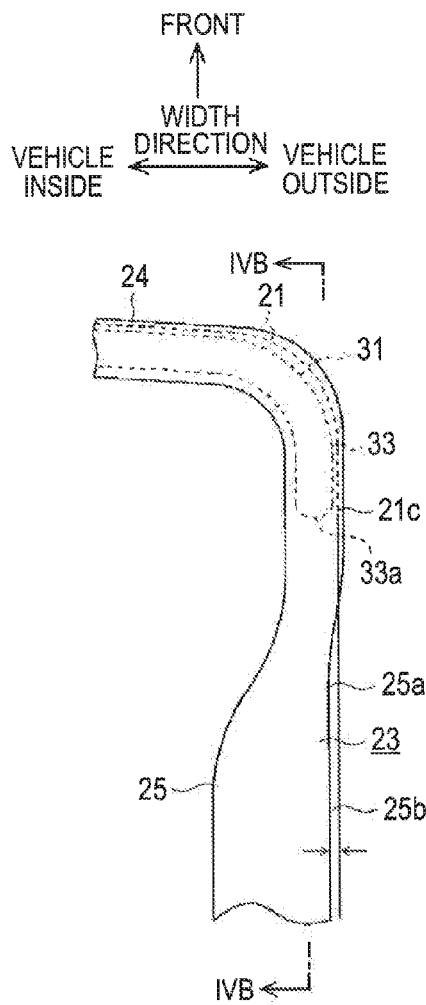
FIG. 4A is a plan view showing the embodiment.
Figure 4B:
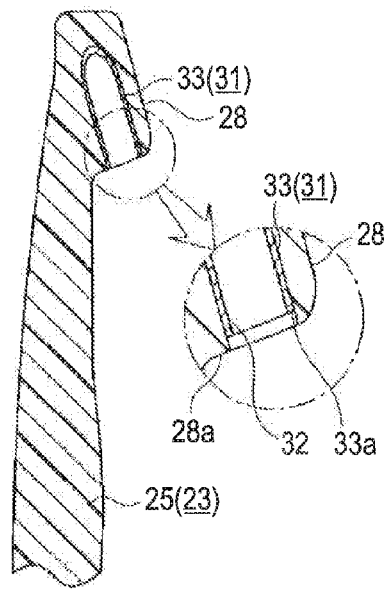
FIG. 4B is a cross-sectional view taken along line IVB-IVB of FIG. 4A.
Figure 5:
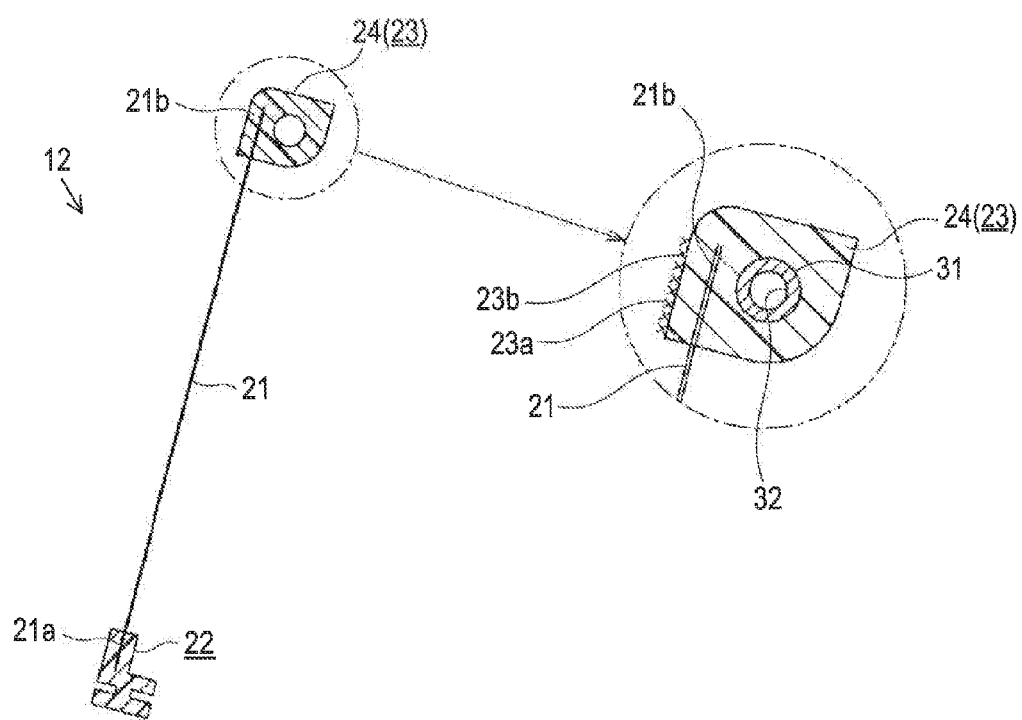
FIG. 5 is a transverse cross section showing the embodiment.

As shown together in FIGS. 4A and 4B and 5, a reinforcing member 31 that extends between front end portions of both the arm portions 25 including the total length of the frame portion 24 along the front edge portion of the roof opening portion 10a farther toward the rear of the vehicle than the terminal portion 21b of the mesh member 21 is buried in the upper frame 23. The reinforcing member 31 is made of, for example, an iron material or an extruded material of an aluminum alloy, and is formed with a hollow portion 32 that communicates over its total length in the extending direction so as to assume a substantially constant cylindrical cross-section. Additionally, although each end portion 33 of the reinforcing member 31 extends to the rear of the vehicle along a connecting portion between the frame portion 24 and each arm portion 25, the end portion inclines downward with respect to the overall extending direction of the arm portion 25. Accordingly, the front end portion of each arm portion 25 is formed with a substantially triangular accommodating portion 28 that protrudes downward with respect to the overall extending direction of the arm portion 25 in order to bury each end portion 33 of the reinforcing member 31. As shown in an enlarged manner in FIG. 4B, a tip 33a of each end portion 33 opens from the upper frame 23 at the accommodating portion 28 of the arm portion 25. That is, the extending direction (longitudinal direction) of the arm portion 25 and the opening direction of the reinforcing member 31 (tip 33a) are different from each other. Additionally, the tip 33a of each end portion 33 recedes from an outer surface 28a of the accommodating portion 28 that surrounds the tip 33a of the upper frame 23, and does not protrude to the outside with respect to the upper frame 23.

In addition, as shown in FIG. 4A, each arm portion 25 has a bent portion 25a of which the outer surface is shifted to the vehicle inside farther toward the rear of the vehicle than the tip 33a of the reinforcing member 31. The outer surface of each arm portion 25 goes through the bent portion 25a, and thereby, is arranged farther toward the vehicle inside than a tip 21c in the extending direction of the mesh member 21. That is, an outer surface 25b of the arm portion 25 that is located farther toward the rear of the vehicle than the tip 33a of the reinforcing member 31 is arranged at a position closer to the vehicle inside than the tip 21c in the extending direction of the mesh member 21. This is provided in order to keep high-speed wind from hitting the rotating shaft 26 or spring 27 that is disposed at the rear end portion of the arm portion 25.

Additionally, as shown in FIG. 5, an embossed portion 23b is formed at an end face 23a of the upper frame 23 (frame portion 24) at the front of the vehicle so as to become coarser than the outer surface other than the end face 23a. The pattern of the embossed portion 23b is molded so as to resemble, for example, the external appearance of the mesh member 21. This is provided so that the terminal portion 21b of the mesh member 21 is not conspicuous even if being arranged near the end face 23a of the upper frame 23, for example, during resin molding. Moreover, the top face of the frame portion 24 (upper frame 23) is formed with a concavo-convex shape (not shown) that becomes concave and convex repeatedly in the extending direction of the frame portion. This is provided so as to suppress fluid noise, so-called window throbbing resulting from the pressure fluctuation or the like produced in the unfolded state (the opened state of the movable panel 13) of the deflector 12.

Next, the operation of the present embodiment will be explained.

First, it is assumed that the movable panel 13 is in a fully closed state and the deflector 12 pushed down from the movable panel 13 side is in the stored state. At this time, as shown by two-dot chain lines in FIG. 3, both the springs 27 are elastically deformed so as to fit below the rear end portions of the arm portions 25, respectively. In this state, if the movable panel 13 operates to open, the upper frame 23 released from the movable panel 13 side with this opening is biased by both the springs 27, and turns clockwise in the drawing about the rotating shafts 26. Thereby, the deflector 12 turns so that the frame portion 24 moves up and is brought into the unfolded state. As the deflector 12 is brought into the unfolded state, the air vibration by the inclusion of wind into the vehicle interior is prevented as described above.

Thereafter, if the movable panel 13 operates to close, the upper frame 23 pushed down from the movable panel 13 side with this closing turns counterclockwise in the drawing about the rotating shafts 26 against the biasing forces of both the springs 27. Thereby, the deflector 12 turns so that the frame portion 24 moves down and is brought into the stored state.

Next, a manufacturing method of the upper frame 23 of the present embodiment will be explained.

Figure 6A:
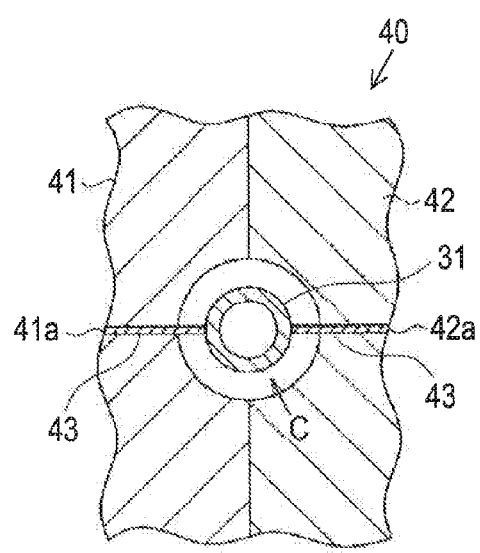
FIG. 6A is a cross-sectional view schematically showing a manufacturing method of the embodiment.
Figure 6B:
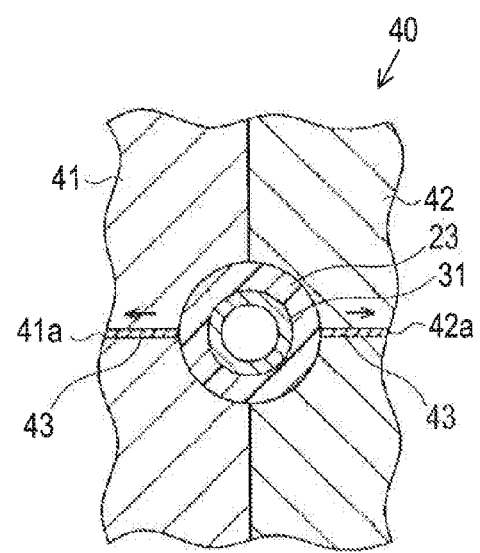
FIG. 6B is a cross-sectional view schematically showing a manufacturing method of the embodiment.
Figure 7:
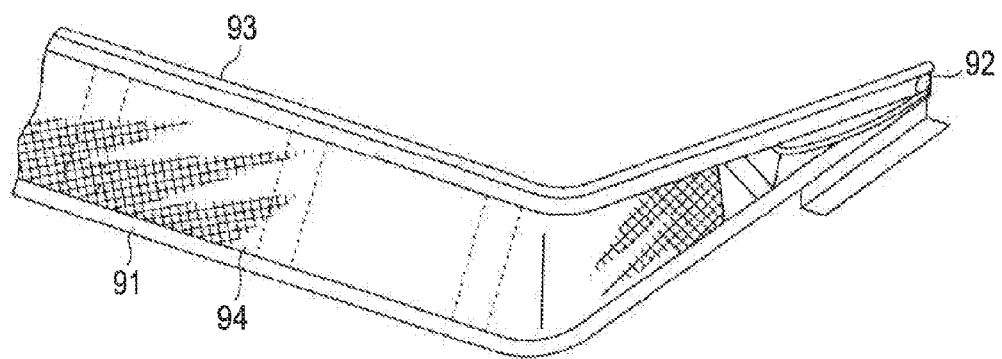
FIG. 7 is a perspective view showing a form of the related art.
Figure 8A:
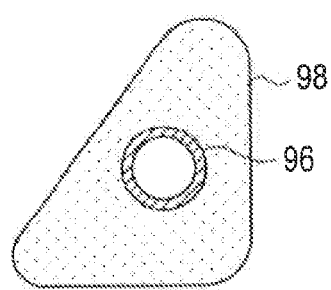
FIG. 8A is a cross-sectional view showing another form of the related art.
Figure 8B:
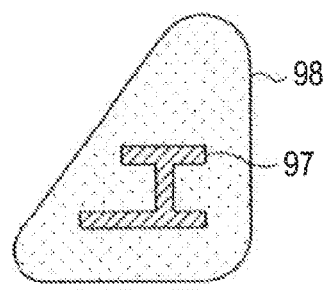
FIG. 8B is a cross-sectional view showing another form of the related art.

As schematically shown in FIGS. 6A and 6B, a mold 40 related to the molding of the upper frame 23 is configured to include a first mold 41 for mainly molding one-side part of the reinforcing member and a second mold 42 for mainly molding the remaining-side part of the reinforcing member, in a direction orthogonal to the extending direction of the reinforcing member 31. Accordingly, a mold cavity C formed by the first and second molds 41 and 42 is molded in conformity with the outer surface of the upper frame 23. The first and second molds 41 and 42 are respectively formed with pin extraction holes 41a and 42a for making an insert holding pin 43 for holding the reinforcing member 31 appear and disappear therefrom, during the insert molding of the reinforcing member 31 within the mold cavity C (within the mold). In addition, although not shown in FIG. 6, the terminal portion 21b of the mesh member 21 is also arranged and accommodated together within the mold cavity C. It is noted herein that the terminal portion 21b of the mesh member 21 is not fixed within the mold cavity C, but is fixed to the upper frame 23 with the resin molding thereof.

As shown in FIG. 6A, in the stage before the injection of resin into the mold cavity C, the reinforcing member 31 is held by the insert holding pin 43 made to protrude onto the mold cavity C from the pin extraction holes 41a and 42a. In this state, resin is injected into the mold cavity C to resin-mold the upper frame 23 as shown in FIG. 6B. In this case, by pulling the insert holding pin 43 out of the mold cavity C (performing so-called pin extraction molding), it is avoided that the pin extraction hole remains in the resin-molded upper frame 23 and the reinforcing member 31 is exposed to the outside at that position.

In addition, since a manufacturing method of the lower frame 22 is the same as that of the upper frame 23 except for the reinforcing member 31 (pin extraction molding), the description thereof is omitted. According to the above, both the terminal portions 21a and 21b of the mesh member 21 are buried in the lower frame 22 and the upper frame 23, respectively, whereby the deflector 12 is manufactured. It is as described above that the rotating shafts 26 or the like are formed integrally with the upper frame 23 of the deflector 12.

As described in detail above, according to the present embodiment, the effects shown below are obtained.

(1) In the present embodiment, both the terminal portions 21a and 21b of the mesh member 21 are buried in the upper frame 23 and the lower frame 22, respectively, and the reinforcing member 31 is buried in the upper frame 23, so that the upper frame 23 and the lower frame 22 can be integrated and fixed together with the resin molding thereof, for example. Accordingly, for example, compared to a case where the upper frame 23 and the lower frame 22, and the mesh member 21 are combined via proper combining means, the number of manufacturing steps can be reduced.

Additionally, the creases of the mesh member 21 that are created in a case where the upper frame 23 and the lower frame 22, and the mesh member 21 are separately combined can be eliminated. Otherwise, since the distance between the upper frame 23 and the lower frame 22 that fix the mesh member 21 can be determined depending on a facility (mold or the like) that resin-molds the frames, variations in the distance can be suppressed. From the above, the external appearance of the mesh member 21 that protrudes onto the face of the roof 10 can be improved.

Moreover, as the reinforcing member 31 is buried in the upper frame 23, the rigidity of the upper frame can be increased. In addition, the reinforcing member 31 is formed with the hollow portion 32 that communicates in the extending direction of the reinforcing member and opens from the upper frame 23 at both ends (tips 33a), so that the deflector 12 can be further reduced in weight and cost as a whole as much as an amount by which resin is not filled into the hollow portion 32.

(2) In the present embodiment, a situation in which the pin extraction hole remains in the upper frame 23 and the reinforcing member 31 is exposed to the outside at that position can be avoided by performing the so-called pin extraction molding in which the insert holding pin 43 for holding the reinforcing member 31 is made movable during the insert molding of the reinforcing member 31 within the mold 40 (mold cavity C) related to the molding of the upper frame 23. Thereby, the reinforcing member 31 comes into contact with the upper frame 23 or the mesh member 21 (terminal portion 21b) in all the remaining part excluding the hollow portion 32 and both the ends (tips 33a), so that the reinforcing member is not exposed to the outside except for the hollow portion 32 and both the ends (tips 33a), and the overall external appearance of the deflector 12 can be improved.

(3) In the present embodiment, the outer surface 25b of the arm portion 25 that is located farther toward the rear of the vehicle than the tip 33a of the reinforcing member 31 is arranged closer to the vehicle inside than the tip 21c in the extending direction of the mesh member 21. Accordingly, high-speed wind can be kept from hitting the peripheral structure (the rotating shafts 26, the springs 27, or the like) of the arm portion 25, and wind noise can be reduced.

(4) In the present embodiment, during the insert molding of the terminal portion 21b of the mesh member 21 within the mold 40 related to the molding of the upper frame 23, the terminal portion 21b may not be fixed within the mold 40, be pushed by injected resin and approach the end face 23a of the upper frame 23. However, the end face 23a of the upper frame 23 is a so-called embossed surface formed with the embossed portion 23*b*, so that the terminal portion 21*b* of the mesh member 21 near the end face 23*a* is not conspicuous and the external appearance can be improved.

(5) In the present embodiment, both the ends (tips 33*a*) of the reinforcing member 31 do not protrude to the outside with respect to the upper frame 23, so that the reinforcing member can be kept from being exposed from the upper frame 23 and the external appearance can be improved.

(6) In the present embodiment, the reinforcing member 31 extends up to the front end portions of the arm portions 25, so that the pitch between both the arms 25 can be kept from changing, for example during resin molding or due to changes over time, and costs can be made low.

(7) In the present embodiment, costs can be made low by adopting the reinforcing member 31 made of an iron material or an extruded material of an aluminum alloy. (8) In the present embodiment, the adhesion between the reinforcing members 31 can be sufficiently secured by molding the upper frame 23 that buries the reinforcing member 31 from, for example, a resin material containing glass fibers.

In addition, the above embodiment may be changed as follows.

In the embodiment, the outer surface 25*b* of the arm portion 25 that is located farther toward the rear of the vehicle than the tip 33*a* of the reinforcing member 31 may be arranged at a position approximately equal to the tip 21*c* in the extending direction of the mesh member 21 in the vehicle width direction.

In the embodiment, the lower frame 22 and the upper frame 23 may be made of the same resin material, or may be made of different resin materials.

In the embodiment, the spring 27 may be, for example, a torsion spring.

In the embodiment, both the arm portions 25 are formed integrally with the frame portion 24 of the upper frame 23. However, both the arm portions may be separately provided as long as the arm portion can bury, for example, the terminal portion 21*b* of the mesh member 21 and reinforcing member 31.

In the embodiment, the reinforcing member 31 may be polygonal tubular. Additionally, the cross-sectional shape of the reinforcing member 31 may change in the extending direction of the reinforcing member.

In the embodiment, the reinforcing member may be a reinforcing member that extends only into the frame portion 24.

In the embodiment, both the ends (tips 33*a*) of the reinforcing member 31 may protrude to the outside with respect to the upper frame 23 (accommodating portion 28).

In the embodiment, instead of the embossed portion 23*b* of the upper frame 23 or in addition to this, an embossed portion may be formed at an end face of the lower frame 22 at the front of the vehicle.

In the embodiment, the embossed portion 23*b* may not be formed at the end face 23*a* of the upper frame 23.

In the embodiment, the outer surface of the arm portion 25 on the vehicle outside may also be shifted to the vehicle inside along the bent portion 25*a*.

In the embodiment, the bent portion 25*a* of the arm portion 25 may not be provided. That is, the outer surface of the arm portion 25 on the vehicle inside that is located farther toward the rear of the vehicle than the tip 33*a* of the reinforcing member 31 may not be arranged closer to the vehicle inside than the tip in the extending direction of the mesh member 21.

In the embodiment, the reinforcing member 31 may not come into contact with the upper frame 23 or the mesh member 21 (terminal portion 21*b*) in parts other than the hollow portion 32 and both the ends (tips 33*a*). That is, the pin extraction molding may not be performed during the insert molding of the reinforcing member 31 within the mold 40 (mold cavity C).

In the embodiment, the reinforcing member 31 is buried in the upper frame 23. Instead of this or in addition to this, however, the same reinforcing member may be buried in the lower frame 22.

In the embodiment, the unfolding and storing of the deflector 12 may be electrically performed in accordance with the opening and closing operation of the movable panel 13.

Therefore, aspects of this disclosure are further described below.

According to a first aspect of this disclosure, there is provided a deflector apparatus for a vehicle including a deflector that is installed at a front edge portion of an opening portion formed in a roof portion of the vehicle and that is capable of being unfolded so as to protrude onto the face of the roof portion. The deflector has an upper frame and a lower frame that extend along the front edge portion of the opening portion and are made of resin; a mesh member that has both terminal portions in a lateral direction buried in the upper frame and the lower frame, respectively, and extends along the front edge portion of the opening portion; and a reinforcing member that is buried in at least one of the upper frame and the lower frame and extends along the front edge portion of the opening portion. The reinforcing member is formed with a hollow portion that communicates in the extending direction of the reinforcing member and opens from the upper frame or the lower frame at both ends thereof.

According to this configuration, both the terminal portions in the lateral direction of the mesh member are buried in the upper frame and the lower frame, respectively, and the reinforcing member is buried in the upper frame or the lower frame, so that the upper frame and the lower frame can be integrated and fixed together with the resin molding thereof, for example. Accordingly, for example, compared to a case where the upper frame and the lower frame, and the mesh member are combined via proper combining means, the number of manufacturing steps can be reduced.

Additionally, the creases of the mesh member that are created in a case where the upper frame and the lower frame, and the mesh member are separately combined can be eliminated. Accordingly, the external appearance of the mesh member that protrudes onto the face of the roof portion can be improved.

Moreover, as the reinforcing member is buried in the upper frame or the lower frame, the rigidity of the upper frame or the lower frame can be increased. In addition, the reinforcing member is formed with the hollow portion that communicates in the extending direction of the reinforcing member and opens from the upper frame or the lower frame at both ends, so that the deflector as a whole can be further reduced in weight as much as an amount by which resin is not filled into the hollow portion.

According to a second aspect of this disclosure, there is provided a deflector apparatus for a vehicle according to the first aspect in which the reinforcing member comes into contact with the upper frame or the lower frame, or the mesh member in all the remaining part excluding the hollow portion and both ends in the extending direction.

According to this configuration, the reinforcing member is not exposed to the outside except for the hollow portion and the both ends in the extending direction, and the overall external appearance of the deflector can be improved.

According to a third aspect of this disclosure, there is provided the deflector apparatus for a vehicle according to the first or second aspect in which the reinforcing member is buried in the upper frame, the upper frame integrally includes an arm portion made of resin that is turnably coupled to the edge of the opening portion, at a rear end portion that extends from a tip portion in the extending direction along the front edge portion of the opening portion to the rear of the vehicle, and an outer surface in a vehicle width direction of the arm portion that is located farther toward the rear of the vehicle than the tip in extending direction of the reinforcing member is arranged at a position farther toward the inside in the vehicle width direction than the tip in the extending direction of the mesh member or at a position approximately equal to the tip in the extending direction of the mesh member.

According to this configuration, high-speed wind can be kept from hitting the peripheral structure (the rotating shaft, the spring that performs turning and biasing to the unfolded state, or the like) of the arm portion, and wind noise can be reduced.

According to a fourth aspect of this disclosure, there is provided the deflector apparatus for a vehicle according to any one of the first to third aspects in which an embossed portion is formed at an end face of at least one of the upper frame and the lower frame at the front of the vehicle so as to become coarser than the outer surface other than the end face.

For example, if both the terminal portions are not fixed within the mold during the insert molding of the terminal portions in the lateral direction of the mesh member within the mold related to the molding of the upper frame and the lower frame that are made of resin, the terminal portions may be pushed by injected resin and approach the end face of the upper frame and the lower frame at the front of the vehicle. According to this configuration, the end face of at least one of the upper frame and the lower frame at the front of the vehicle is a so-called embossed surface formed with the embossed portion, so that the terminal portion of the mesh member near the end face is not conspicuous and the external appearance can be improved.

According to a fifth aspect of this disclosure, there is provided the deflector apparatus for a vehicle according to any one of the first to fourth aspects in which both the ends in the extending direction of the reinforcing member do not protrude to the outside with respect to the upper frame or the lower frame.

According to this configuration, both the ends in the extending direction of the reinforcing member can be kept form being exposed from the upper frame or the lower frame and the external appearance can be improved.

According to a sixth aspect of this disclosure, there is provided the deflector apparatus for a vehicle according to the third aspect in which the reinforcing member extends up to a front end portion of the arm portion.

According to this configuration, the reinforcing member extends up to the front end portion of the arm portion, so that the distance (hereinafter referred to as 'pitch') in the vehicle width direction between both the arm portions can be kept from changing, for example during resin molding or due to changes over time.

In this disclosure, it is possible to provide a deflector apparatus for a vehicle that can improve the external appearance in an unfolded state that protrudes onto the face of a roof portion of a vehicle and can reduce the number of manufacturing steps.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A deflector apparatus for a vehicle including a deflector that is installed at a front edge portion of an opening portion formed in a roof portion of the vehicle and that is capable of being unfolded so as to protrude onto the face of the roof portion, the deflector comprising:
    an upper frame and a lower frame that extend along the front edge portion of the opening portion and are made of resin;
    a mesh member that has both terminal portions in a lateral direction buried in the upper frame and the lower frame, respectively, and extends along the front edge portion of the opening portion; and
    a reinforcing member that is buried in the upper frame and extends along the front edge portion of the opening portion,
    wherein the reinforcing member is formed with a hollow portion that communicates in a longitudinal direction of the reinforcing member and opens from the upper frame at both ends thereof at a respective tip portion,
    the upper frame includes an arm portion that is turnably coupled to an edge of the opening portion, at a rear end portion that extends from the tip portion toward a rear of the vehicle, and
    an outer surface of the arm portion that is located farther toward the rear of the vehicle than the tip portion is arranged in a vehicle width direction at a position closer toward an inside in the vehicle width direction than the tip portion in a longitudinal direction of the mesh member.

2. The deflector apparatus for a vehicle according to claim 1,
    wherein a surface of the reinforcing member that defines the hollow portion does not contact the upper frame.

3. The deflector apparatus for a vehicle according to claim 2,
    wherein the upper frame integrally includes the arm portion, and
    the arm portion is made of resin.

4. The deflector apparatus for a vehicle according to claim 1,
    wherein an embossed portion is formed at an end face of the upper frame at the front of the vehicle so as to become coarser than the outer surface other than the end face.

5. The deflector apparatus for a vehicle according to claim 2,
    wherein an embossed portion is formed at an end face of the upper frame at the front of the vehicle so as to become coarser than the outer surface other than the end face.

6. The deflector apparatus for a vehicle according to claim 1,
    wherein both the ends in the longitudinal direction of the reinforcing member do not protrude to the outside with respect to the upper frame.

7. The deflector apparatus for a vehicle according to claim 2,
    wherein both the ends in the longitudinal direction of the reinforcing member do not protrude to the outside with respect to the upper frame.

8. The deflector apparatus for a vehicle according to claim 3,
 wherein both the ends in the longitudinal direction of the reinforcing member do not protrude to the outside with respect to the upper frame.

9. The deflector apparatus for a vehicle according to claim 4,
 wherein both the ends in the longitudinal direction of the reinforcing member do not protrude to the outside with respect to the upper frame.

10. The deflector apparatus for a vehicle according to claim 5,
 wherein both the ends in the longitudinal direction of the reinforcing member do not protrude to the outside with respect to the upper frame.

11. The deflector apparatus for a vehicle according to claim 1, wherein the reinforcing member extends up to a front end portion of the arm portion.

12. The deflector apparatus for a vehicle according to claim 3, wherein the reinforcing member extends up to a front end portion of the arm portion.

* * * * *